United States Patent [19]

Watanabe et al.

[11] Patent Number: 4,888,312

[45] Date of Patent: Dec. 19, 1989

[54] ZIRCONYL PHOSPHATE SINTERED BODIES AND PRODUCTION THEREOF

[75] Inventors: Keiichiro Watanabe; Tsuneaki Ohashi, both of Nagoya, Japan

[73] Assignee: NGK Insulators, Ltd., Nagoya, Japan

[21] Appl. No.: 199,145

[22] Filed: May 26, 1988

[30] Foreign Application Priority Data

Jun. 5, 1987 [JP] Japan .................................. 62-140050

[51] Int. Cl.$^4$ ............................................. C04B 35/48
[52] U.S. Cl. ................................................... 501/102
[58] Field of Search .......................................... 501/102

[56] References Cited

U.S. PATENT DOCUMENTS 4,703,023 10/1987 Yamai ................................... 501/102

OTHER PUBLICATIONS

Yamai and Oota, J. Am. Ceram. Soc. 70 (8), 585–590 (1987).
Yougyou Gijyutsu Research Institute Annual Report, No. 7, pp. 7–13 (1980) of Nagoya Industrial University.
Yamai and Oota, J. Am. Ceram. Soc. 68, pp. 273–278 (1985).

Primary Examiner—Mark L. Bell
Attorney, Agent, or Firm—Arnold, White & Durkee

[57] ABSTRACT

Zirconyl phosphate sintered bodies are disclosed, which each have a molar ratio of $ZrO_2/P_2O_5$ being not less than 1.8 but less than 2.0 and contain $\beta\text{-}(ZrO)_2P_2O_7$ as a main crystalline phase. The zirconyl phosphate sintered bodies have a coefficient of thermal expansion and a thermal expansion hysteresis in a temperature range from room temperature to 1,4000° C. being not more than $20 \times 10^{-7}/°C$. and 0.05 to 0.30%, respectively. A process for producing zirconyl phosphate sintered bodies is also disclosed, which comprises preparing a starting material powder of zirconyl phosphate, shaping the starting material powder, and firing the shaped bodies. The zirconyl phosphate sintered body has a molar ratio of $ZrO_2/P_2O_5$ being not less than 1.8 but less than 2.0 and the average particle diameter of 0.5 to 20 μm, and contains oxides of an alkali metal and an alkaline earth metal in a total amount of not more than 0.5% by weight.

9 Claims, 4 Drawing Sheets

FIG_1
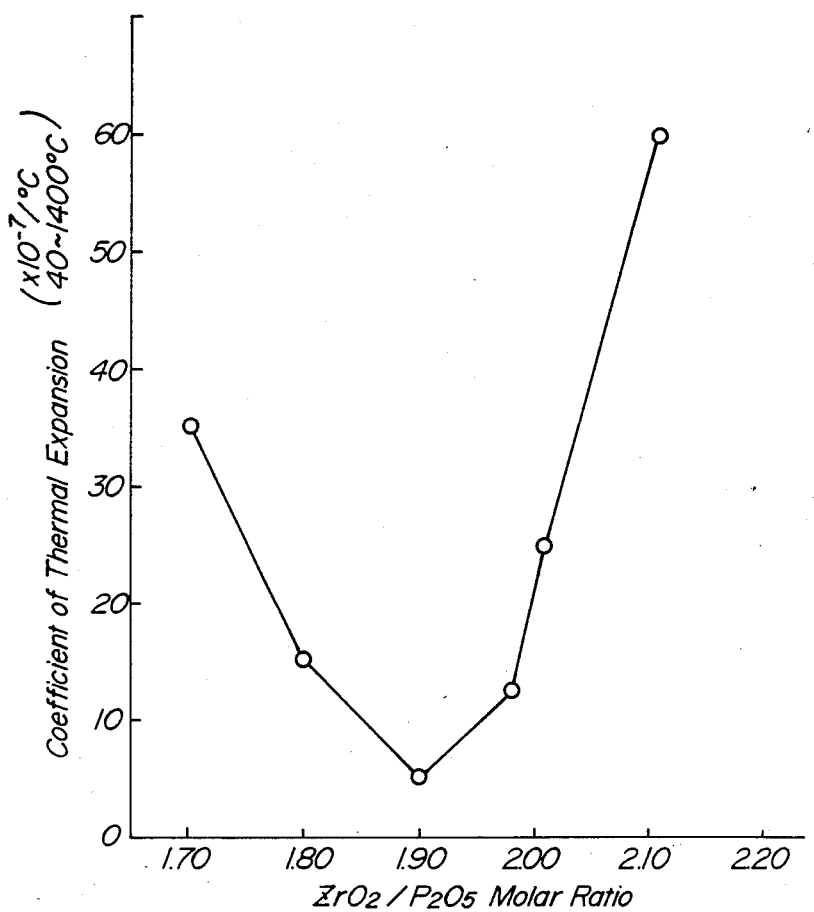

FIG_2
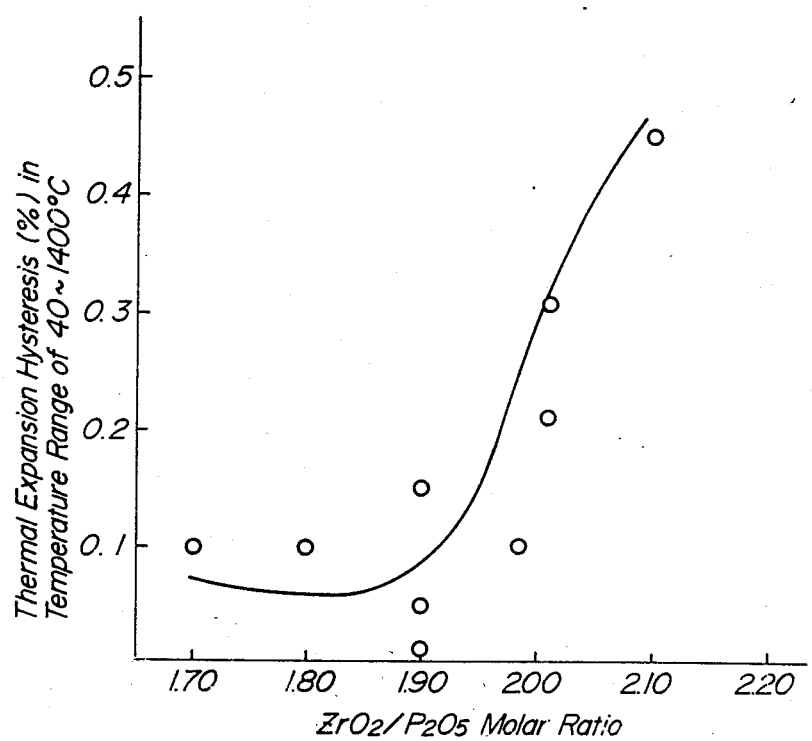

FIG_3
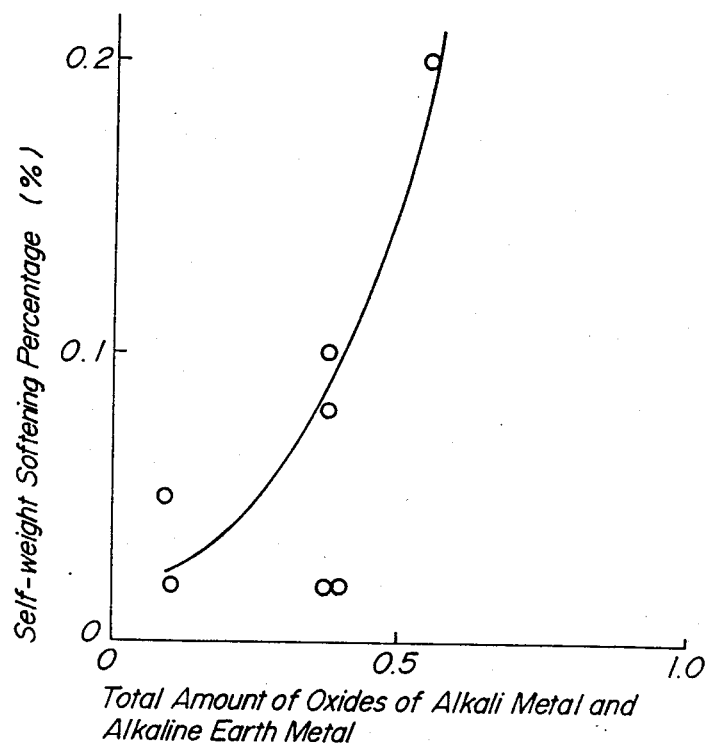

FIG._4
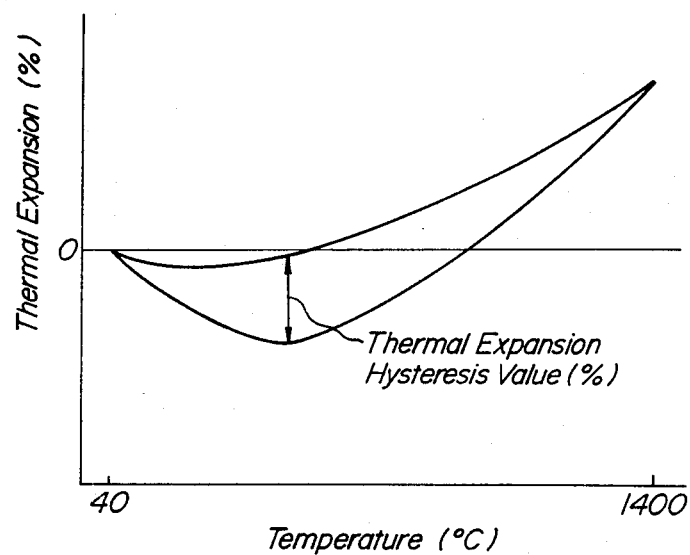
FIG._5
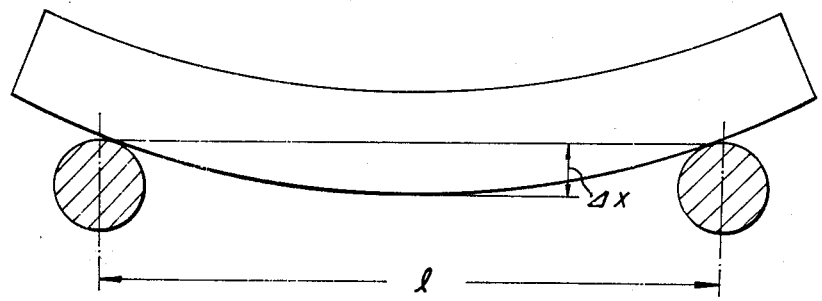

ZIRCONYL PHOSPHATE SINTERED BODIES AND PRODUCTION THEREOF

BACKGROUND OF THE INVENTION (1) Field of the Invention:

The present invention relates to low expansion ceramics and a process for producing the same. More particularly, the invention relates to heat-resisting, low thermal expansion zirconyl phosphate ceramics having excellent thermal shock resistance and heat resistance, and a process for producing them.

(2) Related Art Statement:

With recent advances in industrial technology, demands for materials having excellent heat resistance and thermal shock resistance have increased. Thermal shock resistance of ceramics is influenced by characteristics of materials such as coefficient of thermal expansion, thermal conductivity, strength, Poisson's ratio, etc. as well as the size and configuration of products and heating and cooling states, that is, heat transfer rate.

Among these factors influencing the thermal shock resistance, the contributory percentage of the coefficient of thermal expansion is particularly great. It is known that particularly when the heat transfer rate is large, the thermal shock resistance greatly depends upon the coefficient of thermal expansion only. Thus, desires to develop low expansion materials having excellent thermal shock resistance are still strong.

As relatively low expansion ceramic materials having a coefficient of thermal expansion of about $5 \times 10^{-7}$ to about $20 \times 10^{-7}(1/^\circ C.)$ in a temperature range from 40° C. to 800° C., there exist cordierite (MAS), lithium-.aluminum.silicate (LAS), etc. Melting points of MAS and LAS are low, that is, 1,450° C. and 1,423° C., respectively. For example, when the fitting location of a catalyst converter is changed from a conventional underbed to near an engine to improve purifying efficiency of a catalyst or fitting of a turbocharger is made to improve fuel consumption and engine output; such design changes raise temperatures of exhaust gases as compared with conventional techniques. Accordingly, with respect to ceramic honeycomb structural bodies used in automobile catalytic purifiers, since the temperature of a catalyst bed is raised by 100° to 200° C., it is found that even honeycomb structural carriers mainly composed of cordierite having a high melting point may be clogged due to melting thereof. Under the circumstances, low expansion materials having thermal shock resistance equivalent to or better than that of cordierite as well as excellent heat resistance have earnestly been demanded.

As ceramics having relatively low thermal expansion and high heat resistance, there are available mullite ($3Al_2O_3.2SiO_2$, coefficient of thermal expansion: $53 \times 10^{-7}/^\circ C.$, melting point: 1,750° C.) and zircon ($ZrO_2.SiO_2$, coefficient of thermal expansion: $42 \times 10^{-7}/^\circ C.$, melting point: 1,720° C.) only. However, both of them have the shortcoming that the coefficient of thermal expansion is high and thermal shock resistance is low.

Further, as known low expansion ceramics mainly consisting of zirconyl phosphate, Japanese patent publication No. 61-12,867 describes high strength zirconyl phosphate sintered bodies containing 2–10 molar % of a mixture of $SiO_2/Nb_2O_5$ in a molar ratio of 1 to 8 and 1–6 molar % of $Al_2O_3$. Japanese patent application laid-open No. 60-21,853 describes low expansion zirconium phosphate porcelain containing 0.5 to 6% by weight of magnesium phosphate as a sintering aid. Japanese patent application laid-open No. 61-219,753 describes a process for producing low expansion zirconyl phosphate ceramics by adding 0.3 to 10% by weight of at least one kind of each of a group consisting of ZrO, MgO, $Bi_2O_3$, $MnO_2$, $Co_2O_3$, NiO, $TiO_2$, $CeO_2$, $Nb_2O_5$, and $Ta_2O_5$ as a sintering promoter and a group consisting of $SiO_2$ and a silicate as a grain growth regulator in totally two kinds. Yougyou Gijyutsu Research Institute annual report No. 9, pp 23 to 30 (1982) of Nagoya Industrial University describes zirconyl phosphate ceramics containing 2% by weight of an additive such as MgO, $MnO_2$, $Fe_2O_3$, or ZnO. Each of such sintered bodies have poor heat resistance due to liquid phase sintering in which a sintering mechanism is based on a formation of a liquid phase at a low melting point, and cannot meet the above-mentioned demands.

These sintered bodies have an open porosity of almost zero, are very dense, and include no microcracks in their fine structure. Thus, their coefficients of thermal expansion are relatively high, so that they have poor thermal shock resistance.

SUMMARY OF THE INVENTION

It is an object of the present invention to diminish the above-mentioned problems, and to provide heat-resisting, low expansion zirconyl phosphate sintered bodies having high heat resistance and a low coefficient of thermal expansion, and a process for producing the same.

The heat-resisting, low expansion zirconyl phosphate sintered bodies according to the present invention are characterized in that a molar ratio of $ZrO_2/P_2O_5$ is not less than 1.8 but less than 2.0, that $\beta$-$(ZrO)_2P_2O_7$ is contained as a main crystalline phase, and that the coefficient of thermal expansion and a thermal expansion hysteresis in a temperature range from room temperature to 1,400° C. are not more than $20 \times 10^{-7}/^\circ C.$ and 0.05 to 0.30%, respectively.

The process for producing zirconyl phosphate sintered bodies according to the present invention is characterized by preparing a starting material powder of zirconyl phosphate in which the molar ratio of $ZrO_2/P_2O_5$ is not less than 1.8 but less than 2.0, a total amount of oxides of an alkali metal and an alkaline earth metal is not more than 0.5% by weight, and the average particle size is 0.5 to 20 $\mu$m, followed by shaping and sintering.

In the above-mentioned construction, ceramics having excellent heat resistance and thermal shock resistance in which the coefficient of thermal expansion and the thermal expansion hysteresis in a temperature range from room temperature to 1,400° C. are not more than $20 \times 10^{-7}/^\circ C.$ and 0.05 to 0.30%, respectively, the open porosity is in a range from 5 to 50%, and a self-weight softening percentage after thermal treatment at 1,300° C. for 5 hours is not more than 0.1% can be obtained by controlling the molar ratio of $ZrO_2/P_2O_5$ to not less than 1.8 but less than 2.0, and preferably precipitating a trace amount of a $ZrP_2O_7$ phase.

These and other objects, features and advantages of the invention will be appreciated upon reading of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a diagram showing a relationship between the molar ratio of $ZrO_2/P_2O_5$ and the coefficient of thermal expansion for zirconyl phosphate sintered bodies;

FIG. 2 is a diagram showing the relationship between the molar ratio of $ZrO_2/P_2O_5$ and the thermal expansion hysteresis for the zirconyl phosphate sintered bodies;

FIG. 3 is a diagram showing the relationship between the self-weight softening percentage after thermal treatment at 1,300° C. for 5 hours and the total amount of oxides of an alkali metal and an alkaline earth metal;

FIG. 4 is a diagram showing a way of determining the thermal expansion hysteresis; and FIG. 5 illustrates a way of measuring the self-weight softening percentage.

DETAILED DESCRIPTION OF THE INVENTION

First, the reasons for the limitations made in the present invention will be explained below.

When the coefficient of thermal expansion in a temperature range from room temperature to 1,400° C. is not more than $20 \times 10^{-7}/°$ C., thermal shock resistance is sufficient as practically applicable materials. When the thermal shock hysteresis in a temperature range from room temperature to 1,400° C. is in a range from 0.05 to 0.30, increase or growth of microcracks even during use under heat cycling is so small that satisfactory durability can be obtained. "Microcracks" referred to here means fine cracks which are contained in the sintered body and are not more than 1 μm in width. These microcracks are formed in zirconyl phosphate having a microstructure composed of large crystallites of 10–50 μm and small crystallites of few microns.

When the open porosity is 5 to 50%, zirconyl phosphate sintered bodies can be applied to carriers for catalyst to purify waste gases from automobiles, carriers for catalytic combustion, rotary heat regenerating type heat exchangers, heat transfer type heat exchangers, housings for ceramic turbocharger rotors, heat insulating materials inside engine manifolds, etc.

The reason why the molar ratio of $ZrO_2/P_2O_5$ is controlled to less than 2.0 is to prevent precipitation of $ZrO_2$. If $ZrO_2$ precipitates in a sintered body, the coefficient of thermal expansion of the sintered body increases due to high expansibility of $ZrO_2$, thereby lowering a temperature range at which the sintered body can withstand thermal shocks. Further, the precipitated $ZrO_2$ undergoes a phase transformation at about 1,000° C. accompanied by a rapid, great volumetric change. For this reason, it shrinks by as much as about 4% due to the phase transformation from the monoclinic phase to the tetragonal phase at about 1,000° C., during heating from low temperatures. Further, it reversely expands by as much as about 4% due to the phase transformation from the tetragonal phase to the monoclinic phase during cooling from high temperatures. Accordingly, great stress develops inside the sintered body due to volumetric expansion and shrinkage caused by the phase transformation during temperature ascending and descending between temperatures involving 1,000° C. therein so that cracks are formed, the sintered body is cracked, the dimension greatly increases, or strength is conspicuously deteriorated. Thus, it is necessary to prevent the precipitation of $ZrO_2$.

The reason why the molar ratio of $ZrO_2/P_2O_5$ is set at not less than 1.8 is that if it is less than 1.8, the coefficient of thermal expansion of the sintered body becomes greater due to conspicuous precipitation of the $ZrP_2O_7$ phase.

Even by controlling the molar ratio of $ZrO_2/P_2O_5$ to not less than 1.8 but less than 2.0, a trace amount of the $ZrP_2O_7$ phase precipitates in some cases. Since $Zr_2P_2O_9$ is likely to form a liquid phase upon easy reaction with oxides of an alkali metal and an alkaline earth metal so that abnormal grain growth readily occurs. However, since the $ZrP_2O_7$ phase is thermally stable, abnormal grain growth of $Zr_2P_2O_9$ during sintering can be prevented by a trace amount of the $ZrP_2O_7$ phase precipitated in grain boundaries. If the thermal grain of $Zr_2P_2O_9$ occurs during sintering, strength is greatly deteriorated so that strength necessary for practically applicable materials cannot be obtained.

Further, since the $ZrP_2O_7$ phase precipitated in the grain boundaries has an effect of preventing slipping at the grain boundaries due to the formation of the liquid phase, it reduces the self-weight softening percentage at high temperatures and enhances heat resistance.

By preventing the precipitation of $ZrO_2$ and the abnormal grain growth in the sintered body, it is possible to control the coefficient of thermal expansion and the thermal expansion hysteresis in a temperature range from room temperature to 1,400° C. to not more than $20 \times 10^{-7}/°$ C. and 0.05 to 0.30%, respectively. Furthermore, since such a sintered body can exclude influences due to oxides of an alkali metal and an alkali earth metal as impurities, the sintered body has excellent heat resistance in that the self-weight softening percentage after heat treatment at 1,300° C. for 5 hours is not more than 0.1%. Further, despite that the open porosity is as large as 5 to 50%, the sintered body has the microstructure free from the abnormal grain growth. Thus, the sintered body has necessary strength for practical applications and low expansibility due to an appropriate amount of microcracks contained in the body.

The reason why the molar ratio of $ZrO_2/P_2O_5$ in the $Zr_2P_2O_9$ starting material powder is controlled to not less than 1.8 but less than 2.0 according to the producing process of the present invention is to prevent precipitation of $ZrO_2$ by controlling the molar ratio of $ZrO_2/P_2O_5$ in the sintered body within this range.

In addition, preferably the abnormal grain growth of crystals in the sintered body is prevented by precipitating a trace amount of the $ZrP_2O_7$ phase, so that the self-weight softening at high temperatures is suppressed to further improve heat resistance.

The reason why the total amount of oxides of an alkali metal and an alkaline earth metal as impurities in the $Zr_2P_2O_7$ starting material powder is controlled to not more than 0.5% by weight is that formation of the liquid phase during sintering is suppressed, the abnormal grain growth of the crystals in the sintered body is prevented, and heat resistance giving rise to the self-weight softening percentage of not more than 0.1% even in the heat treatment at 1,300° C. for 5 hours is attained.

Further, the reason why the average particle size of the $Zr_2P_2O_9$ starting material powder is limited to 0.5 to 20 μm is that if a starting material powder having the average particle diameter of more than 20 μm is used, sinterability is poor and sufficient strength cannot be obtained, while if the average particle diameter is less than 0.5 μm, shapability is poor and abnormal grain growth is likely to occur, and the diameter of the crystalline grains becomes very small so that microcracks are difficult to produce and low expansibility cannot be obtained.

By using the starting material meeting the above requirements, shaped bodies having arbitrary configurations can be obtained by press shaping, extruding, slip casting, ram process, or injection molding, which gives the sintered bodies according to the present invention after sintering.

As firing conditions giving the sintered bodies according to the present invention, it is preferable that the sintering temperature is 1,500° to 1,700° C., the heating rate in a temperature range from 1,000° C. to the sintering temperature is 10° to 300° C./hr, and the cooling rate in a temperature range from the sintering temperature to 1,000° C. is 50° to 1,000° C./hr.

The reason why the sintering temperature is limited to 1,500° to 1,700° C. is that if it is less than 1,500° C., $Zr_2P_2O_9$ is not fully sintered, while if it is more than 1,700° C., $P_2O_5$ conspicuously evaporates during the sintering so that the molar ratio of $ZrO_2/P_2O_5$ in the sintered body becomes 2.0 or more to precipitate $ZrO_2$.

The reason why the heating rate in a temperature range from 1,000° C. to the sintering temperature is limited to 10° to 300° C./hr is that if it is less than 10° C./hr, a $ZrO_2$ layer is likely to be formed on the surface of the sintered body due to evaporation of $P_2O_5$, while if it is more than 300° C., firing cracks occur with shrinking of the sintered body.

The reason why the cooling rate in a temperature range from the sintering temperature to 1,000° C. is limited to 50° to 1,000° C./hr is that if it is less than 50° C./hr, a $ZrO_2$ layer is likely to be formed on the surface of the sintered body due to the evaporation of $P_2O_5$ as in the case of the temperature rising, while if it is more than 1,000° C./hr, cooling cracks are produced due to thermal shock during cooling. For instance, the sintering time is preferably 1 to 10 hours.

Examples of the present invention will be explained below. These Examples are merely given in illustration of the invention, but should not be interpreted to limit the scope of the invention.

EXAMPLES 1–4

Powders of zirconyl phosphate having respective mixing ratios and the particle sizes preliminarily adjusted as shown in Table 1 were used. The particle size of the zirconyl phosphate was adjusted by using a vibration mill, a pot mill, or an attritor mill, which was filled with $ZrO_2$ sintered grinding media of about 5 mm in diameter. As the $ZrO_2$ sintered grinding media, $ZrO_2$ stabilized with MgO or $Y_2O_3$ was used. The chemical composition of the grinding media used is shown in Table 2. Chemical analysis values of starting materials are shown in Table 3.

Five parts by weight of a 10% aqueous solution of PVA was added and fully mixed into 100 parts by weight of a mixture having the mixing ratio shown in Table 1, which was press shaped under a pressure of 100 kg/cm² by using a mold of 25×80×6 mm, and rubber pressed under a pressure of 2 ton/cm², followed by drying. The dried body was fired in air inside an electric furnace under firing conditions given in Table 1. After the sintering, the sintered body was machined to obtain flexural test pieces of 3×4×40 mm specified in JIS R 1601 (1981). With respect to the thus obtained test pieces, coefficient of thermal expansion in a temperature range from 40° to 1,400° C., four point bending strength, self-weight softening amount, open porosity, and melting point were measured. The coefficient of thermal expansion was measured with a push rod differential type thermal expansion meter using a high purity alumina sintered body. The measuring temperature ranged from 40° to 1,400° C. The four point strength was measured according to a method shown in JIS R 1601. The self-weight softening amount was determined according to the following equation by placing each of the above flexural test pieces of 3×4×40 mm on supports spaced by 30 mm as shown in FIG. 5, thermally treating to at 1,300° C. in air for 5 hours, and then measuring a self-weight deformed amount Δx.

Self-weight softening percentage = $\Delta x/l \times 100$ (%) "l" denotes the distance between the supports.

The open porosity was measured according to the Archimedean principle. The melting point was visually judged by checking whether the sintered test piece cut in the form of 3×4×5 mm was melted or not when it was thermally treated at 1,700° C. for 10 minutes in the electric furnace. Amounts of crystalline phases in the sintered body were determined by comparing a peak value reflected on a (111) plane of m-$ZrO_2$, a peak value reflected on a (333) plane of zirconyl phosphate ($ZrP_2O_7$) and a peak value reflected on a (002) plane of zirconyl phosphate* [$\beta$-$(ZrO)_2P_2O_7$]. In Table 1, Z/P denotes the molar ratio of $ZrO_2/P_2O_5$.

TABLE 1

|  |  | Example |  |  |  | Comparative Example |  |  |  |
|---|---|---|---|---|---|---|---|---|---|
|  |  | 1 | 2 | 3 | 4 | 10 | 11 | 12 | 13 |
| Chemical composition (wt %) | $ZrO_2$ | 60.74 | 62.02 | 63.16 | 62.02 | 62.02 | 63.30 | 59.24 | 64.64 |
|  | $P_2O_5$ | 38.86 | 37.60 | 36.75 | 37.60 | 31.60 | 36.32 | 40.21 | 35.26 |
|  | MgO | 0.18 | 0.35 | 0.06 | 0.35 | 0.35 | 0.35 | 0.19 | 0.09 |
|  | CaO | 0.16 | — | 0.02 | — | — | — | 0.20 | — |
|  | NaKO | 0.06 | 0.03 | 0.01 | 0.03 | 0.03 | 0.03 | 0.16 | 0.01 |
|  | $ZrO_2/P_2O_5$ | 1.80 | 1.90 | 1.98 | 1.90 | 1.90 | 2.01 | 1.70 | 2.11 |
| Mixing ratio (wt %) | Zirconyl phosphate A (Z/P = 1.70) |  |  |  |  |  |  | 100 |  |
|  | Zirconyl phosphate B (Z/P = 1.80) | 100 |  |  |  |  |  |  |  |
|  | Zirconyl phosphate C (Z/P = 1.90) |  | 100 |  | 100 | 100 | 100 |  |  |
|  | Zirconyl phosphate D (Z/P = 1.98) |  |  | 100 |  |  |  |  |  |

TABLE 1-continued

| | | Example | | | | Comparative Example | | | |
|---|---|---|---|---|---|---|---|---|---|
| | | 1 | 2 | 3 | 4 | 10 | 11 | 12 | 13 |
| | Zirconyl phosphate E (Z/P = 2.10) | | | | | | | | 100 |
| | Zirconyl phosphate F (Z/P = 1.90) | | | | | | | | |
| | Average particle diameter (μm) | 0.8 | 0.5 | 10 | 20 | | 30 | | 0.3 |
| | Sintering temperature (°C.) | 1,650 | 1,700 | 1,600 | 1,500 | 1,400 | 1,750 | 1,650 | 1,650 |
| | Keeping time (hr) | 2 | 1 | 5 | 10 | 0.5 | 1 | 5 | 5 |
| Firing conditions | Heating rate (°C./hr, 1,000° C. ~ sintering temperature) | 100 | 300 | 100 | 50 | 500 | 5 | 100 | 100 |
| | Cooling rate (°C./hr, sintering temperature ~ 1,000° C.) | 500 | 1,000 | 300 | 50 | 500 | 1,200 | 500 | 20 |
| Crystalline phase | Zirconyl phosphate (β-(ZrO)$_2$P$_2$O$_7$)* | S | S | S | S | S | S | S | S |
| | Zirconyl phosphate (ZrP$_2$O$_7$) | m | W | — | W | W | — | m | — |
| | m-ZrO$_2$ | — | — | — | — | — | W | — | m |
| Characteristics of sintered bodies | Thermal expansion hysteresis (%, 40 ~ 1,400° C.) | 0.10 | 0.15 | 0.10 | 0.05 | 0.01 | 0.31 | 0.10 | 0.45 |
| | Open porosity (%) | 10 | 5 | 15 | 50 | 60 | 10 | 2 | 20 |
| | Self-weight softening percentage (%, 1,300° C. × 5 hr) | 0.02 | 0.02 | 0.05 | 0.08 | 0.10 | 0.02 | 0.20 | 0.02 |
| | Melting point (°C.) | >1,700 | >1,700 | >1,700 | >1,700 | >1,700 | >1,700 | >1,700 | >1,700 |
| | 4-point flexural strength (kg/cm$^2$) | 500 | 700 | 600 | 200 | 50 | 30 | 60 | 50 |
| | CTE (× 10$^{-7}$/°C., 40 ~ 1,400° C.) | 15 | 5 | 12 | 20 | 30 cut during firing | 25 cracked during cooling | 35 abnormal grain growth | 60 abnormal grain growth |

S: Strong>m: medium>W: weak>VW: very weak
*Communications of the American Ceramic Society, C-80 (1984)

TABLE 2

| | MgO-stabilized ZrO$_2$ grinding media | Y$_2$O$_3$-stabilized ZrO$_2$ grinding media |
|---|---|---|
| SiO$_2$ | 0.28 | <0.05 |
| Al$_2$O$_3$ | 0.037 | <0.02 |
| Fe$_2$O$_3$ | 0.14 | 0.10 |
| TiO$_2$ | 0.12 | <0.01 |
| CaO | 0.29 | <0.005 |
| MgO | 3.37 | 0.007 |
| K$_2$O | 0.010 | <0.005 |
| Na$_2$O | 0.047 | <0.01 |
| Y$_2$O$_3$ | — | 5.04 |
| ZrO$_2$ | 94.19 | 92.90 |
| HfO$_2$ | 1.65 | 2.11 |
| Total | 100.13 | 100.16 |

TABLE 3

| | Chemical analysis values | | | | | | | | | | ZrO$_2$/P$_2$O$_5$ |
|---|---|---|---|---|---|---|---|---|---|---|---|
| | ZrO$_2$ | P$_2$O$_5$ | SiO$_2$ | Al$_2$O$_3$ | MgO | CaO | NaKO | Nb$_2$O$_5$ | Ig. loss | Fe$_2$O$_3$ | (mol/mol) |
| Zirconyl phosphate A | 56.07 | 38.06 | <0.2 | 0.14 | 0.18 | 0.19 | 0.15 | — | 5.21 | <0.01 | 1.70 |
| Zirconyl phosphate B | 50.93 | 32.58 | <0.2 | 0.03 | 0.15 | 0.14 | 0.05 | — | 14.30 | <0.01 | 1.80 |
| Zirconyl phosphate C | 60.14 | 36.46 | <0.2 | <0.01 | 0.34 | <0.01 | 0.03 | — | 2.53 | <0.01 | 1.90 |
| Zirconyl phosphate D | 60.05 | 34.93 | <0.2 | 0.01 | 0.06 | 0.02 | 0.01 | — | 4.92 | <0.01 | 1.98 |
| Zirconyl phosphate E | 63.45 | 34.80 | <0.2 | 0.02 | 0.09 | <0.01 | 0.01 | — | 1.65 | <0.01 | 2.10 |
| Zirconyl phosphate F | 61.46 | 37.26 | <0.2 | 0.04 | 0.01 | <0.01 | 0.01 | — | 1.22 | <0.01 | 1.90 |
| Nb$_2$O$_5$ | — | — | <0.01 | — | — | — | — | 99.9 | 0.1 | <0.01 | — |
| Cordierite | — | — | 55.90 | 28.06 | 13.53 | 0.23 | 0.81 | — | 1.22 | 1.35 | — |

As a result, it was revealed that ceramics in which the coefficient of thermal expansion and the thermal expansion hysteresis in a temperature range from 40° to 1,400° C. were not more than 20×10$^{-7}$/° C. and 0.05 to 0.30%, respectively, the open porosity was 5 to 50%, and the self-weight softening percentage after heat treatment at 1,300° C. for 5 hours was not more than 0.1% and which had excellent heat resistance and thermal shock resistance could be obtained by controlling the molar ratio of ZrO$_2$/P$_2$O$_5$ in the sintered body to not less than 1.8 but less than 2.0 and preferably further precipitating a trace amount of ZrP$_2$O$_7$ phase. In Comparative Example 10, the thermal expansion hysteresis was less than 0.5% and the coefficient of thermal expansion was more than 20×10$^{-7}$/° C. Thus, thermal shock resistance is lowered.

Further, if the molar ratio of ZrO$_2$/P$_2$O$_5$ was 2.0 or more, m-ZrO$_2$ precipitated and the coefficient of thermal expansion exceeded 20×10$^{-7}$/° C. to lower thermal shock resistance. In addition, the thermal expansion hysteresis exceeded 0.30 due to the precipitation of m-$ZrO_2$. Furthermore, if the molar ratio of $ZrO_2/P_2O_5$ is less than 1.8, an amount of precipitated $ZrP_2O_7$ phase was too much, resulting in high expansibility. It is seen from FIG. 1 that the molar ratio of $ZrO_2/P_2O_5$ is preferably in a range from 1.85 to 1.95, because the coefficient of thermal expansion becomes not more than $10 \times 10^{-7}/°$ C.

It is also seen that the molar ratio of $ZrO_2/P_2O_5$ in the sintered body can be controlled by preliminarily adjusting that in the starting materials.

Further, if the oxides of an alkali metal and an alkaline earth metal in the starting material exceed 0.5% by weight, abnormal grain growth conspicuously occurs in the sintered body to lower strength. Further, it is seen that the self-weight softening percentage exceeds 0.15% and heat resistance is deteriorated.

If the sintering temperature is less than 1,500° C., sintering is not sufficiently effected, so that the open porosity exceeds 60% and strength is conspicuously lowered. If the sintering temperature is more than 1,700° C., m-$ZrO_2$ precipitates in a great amount with evaporation of $P_2O_5$ to result in high expansibility. If the heating rate in a temperature range from 1,000° C. to the sintering temperature is less than 10° C./hr, m-$ZrO_2$ precipitates. On the other hand, if it is more than 300° C./hr, the sintered body is cut during firing. If the cooling rate in a temperature range from 1,000° C. is less than 50° C./hr, a $ZrO_2$ layer is likely to be formed due to evaporation of $P_2O_5$, while if it is more than 1,000° C., the sintered body is cracked during cooling.

The above-mentioned facts are seen from the results in Examples 1-4 and Comparative Examples 10-13.

EXAMPLES 5 to 8

Five to ten parts by weight of water and 20 parts by weight of starch paste (containing 80% of water) were added and well kneaded with 100 parts by weight of a mixture selected from zirconyl phosphate, cordierite and $Nb_2O_5$ by using a kneader, which was extruded as a honeycomb column-like body having four sides of 65 mm wide and a height of 120 mm long by a vacuum extruder. The honeycomb structural body had cells of a rectangular section in which a pitch was 1.27 mm and the thickness of thin walls was 0.15 mm. After being dried, the honeycomb structural body was fired under firing conditions given in Table 4. Thus, zirconyl phosphate ceramic honeycomb structural bodies in Examples 5-8 according to the present invention were obtained.

With respect to the zirconyl phosphate ceramic honeycomb structural bodies shown in Table 4, amounts of crystalline phases were compared according to a powder X-ray diffraction method in the same manner as the press test pieces, and the coefficient of thermal expansion and the thermal expansion hysteresis in a temperature range from 40° to 1,400° C., open porosity, self-weight softening percentage, and melting point were measured and compared.

Honeycomb structural elements having a size of 1 inch in diameter and 1 inch long were cut in an extruding direction, and their compression strength was measured. Results are shown in Table 4.

TABLE 4

| | | Example | | | |
|---|---|---|---|---|---|
| | | 5 | 6 | 7 | 8 |
| Chemical composition (wt %) | $ZrO_2$ | 62.02 | 62.22 | 62.12 | 63.15 |
| | $P_2O_5$ | 37.60 | 37.73 | 37.66 | 36.73 |
| | MgO | 0.35 | 0.04 | 0.01 | 0.09 |
| | CaO | — | — | — | 0.02 |
| | NaKO | 0.03 | 0.01 | 0.01 | 0.01 |
| | $Nb_2O_5$ | — | — | 0.20 | — |
| | $ZrO_2/P_2O_5$ | 1.90 | 1.90 | 1.90 | 1.98 |
| Mixing ratio (wt %) | Zirconyl phosphate A (Z/P = 1.70) | | | | |
| | Zirconyl phosphate B (Z/P = 1.80) | | | | |
| | Zirconyl phosphate C (Z/P = 1.90) | 100 | | | |
| | Zirconyl phosphate D (Z/P = 1.98) | | | | 99.8 |
| | Zirconyl phosphate E (Z/P = 2.10) | | | | |
| | Zirconyl phosphate F (Z/P = 1.90) | | 99.8 | 99.8 | |
| | Cordierite | | 0.2 | | 0.2 |
| | $Nb_2O_5$ | | | 0.2 | |
| | Average particle diameter (μm) | 2 | 5 | 10 | 5 |
| | Sintering temperature (°C.) | 1,600 | 1,600 | 1,600 | 1,600 |
| | Keeping time (hr) | 5 | 5 | 5 | 5 |
| Firing conditions | Heating rate (°C./hr, 1,000° C.~sintering temperature) | 20 | 20 | 20 | 20 |
| | Cooling rate (°C./hr, sintering temperature~1,000° C.) | 600 | 600 | 600 | 600 |
| Crystalline phase | Zirconyl phosphate ($\beta$-$(ZrO)_2P_2O_7$) | S | S | S | S |
| | Zirconyl phosphate ($ZrP_2O_7$) | W | W | W | — |
| | m-$ZrO_2$ | — | — | — | — |
| Characteristics of sintered bodies | Thermal expansion hysteresis (%, 40~1,400° C.) | 0.10 | 0.08 | 0.05 | 0.10 |
| | Open porosity (%) | 15 | 10 | 20 | 11 |
| | Self-weight softening percentage (%, 1,300° C. × 5 hr) | 0.01 | 0.02 | 0.02 | 0.02 |
| | Melting point (°C.) | >1,700 | >1,700 | >1,700 | >1,700 |
| | Compression strength (kg/cm²) | 700 | 850 | 550 | 820 |
| | CTE ($\times 10^{-7}/°$C., 40~1,400° C.) | 9 | 10 | 11 | 10 |

S: Strong > W: Weak

As is evident from the afore-detailed explanation, according to the heat-resisting, low thermal expansion zirconyl phosphate sintered bodies and the producing process thereof in the present invention, the zirconyl phosphate ceramics in which the molar ratio of $ZrO_2/P_2O_5$ is not less than 1.8 but less than 2.0, $\beta$-$(ZrO)_2P_2O_7$ is the main crystalline phase, the coefficient of thermal expansion and the thermal expansion hysteresis in a temperature range from room temperature to 1,400° C. are not more than $20 \times 10^{-7}/°$ C. and 0.05 to 0.30%, respectively, can be obtained.

Thus, their applicable range is wide as low expansion materials required to have thermal shock resistance. For example, when honeycomb structural bodies are shaped by extruding or the like, they are sufficiently practically employed as carriers for catalyst to purify waste gases from automobiles, carriers for catalytic combustion, rotary regenerating type ceramic heat exchangers, heat transfer type heat exchangers, etc. When they are shaped by slip casting, press molding, injection molding, or the like, they are practically employed as housings for ceramic turbocharger rotors and heat insulating materials inside engine manifolds.

What is claimed is:

1. A zirconyl phosphate sintered body having a molar ratio of $ZrO_2/P_2O_5$ of at least 1.8 and less than 2.0, said zirconyl phosphate comprising $\beta$-$(ZrO)_2P_2O_7$ as a main crystalline phase, wherein a coefficient of thermal expansion and a thermal expansion hysteresis in a temperature range from room temperature to 1,400° C. are not greater than $20 \times 10^{-7}$/° C. and 0.05 to 0.30%, respectively.

2. The zirconyl phosphate sintered body of claim 1, further comprising minor amounts of $ZrP_2O_7$ as a secondary crystalline phase.

3. The zirconyl phosphate sintered body of claim 1, wherein an open porosity of said sintered body is 5 to 50% and a self-weight softening percentage when the sintered body is thermally treated at 1,300° C. for five hours is not greater than 0.1%.

4. The zirconyl phosphate sintered body of claim 1, wherein the coefficient of thermal expansion in a temperature range from room temperature to 1,400° C. is not greater than $10 \times 10^{-7}$/° C.

5. A zirconyl phosphate sintered body having a molar ratio of $ZrO_2/P_2O_5$ of 1.85 to 1.95, said zirconyl phosphate comprising $\beta$-$(ZrO)_2P_2O_7$ as a main crystalline phase, wherein a coefficient of thermal expansion and a thermal expansion hysteresis in a temperature range from room temperature to 1,400° C. are not greater than $20 \times 10^{-7}$/° C. and 0.05 to 0.30%, respectively.

6. The zirconyl phosphate sintered body of claim 5, further comprising minor amounts of $ZrP_2O_7$ as a secondary crystalline phase.

7. A zirconyl phosphate sintered body having a molar ratio of $ZrO_2/P_2O_5$ of 1.85 to 1.95, said zirconyl phosphate comprising $\beta$-$(ZrO)_2P_2O_7$ as a main crystalline phase, and minor amounts of $ZrP_2O_7$ as a secondary crystalline phase, wherein a coefficient of thermal expansion and a thermal expansion hysteresis in a temperature range from room temperature to 1,400° C. are not greater than $10 \times 10^{-7}$/° C. and 0.05 to 0.30%, respectively.

8. A process for producing zirconyl phosphate sintered bodies, comprising preparing a starting material powder of zirconyl phosphate, shaping the starting material powder, and firing the shaped body, said starting material powder of zirconyl phosphate having a molar ratio of $ZrO_2/P_2O_5$ of at least 1.8 and less than 2.0, an average particle diameter of 0.5 to 20 microns, and a total amount of oxides of an alkali metal and an alkaline earth metal of not greater than 0.5% by weight.

9. A process for producing zirconyl phosphate sintered bodies, comprising preparing a starting material powder of zirconyl phosphate, shaping the starting material powder, and firing the shaped body, said starting material powder of zirconyl phosphate having a molar ratio of $ZrO_2/P_2O_5$ of 1.85 to 1.95, an average particle diameter of 0.5 to 20 microns, and a total amount of oxides of an alkali metal and an alkaline earth metal of not greater than 0.5% by weight.

* * * * *